United States Patent [19]

Ogawa et al.

[11] Patent Number: 5,391,682
[45] Date of Patent: Feb. 21, 1995

[54] THERMOPLASTIC POLYURETHANE ELASTOMER, PROCESS FOR PRODUCING SAME, APPARATUS PRODUCING SAME AND ELASTOMER FIBERS MADE FROM SAME

[75] Inventors: Yasuhiro Ogawa, Suita; Kenzo Sagawa, Houfu; Takahiro Kitano, Houfu; Michiya Yamashita, Houfu; Tadaaki Yamada, Houfu; Toshio Yamauchi, Osaka, all of Japan

[73] Assignee: Kanebo, Ltd., Tokyo, Japan

[21] Appl. No.: 175,359

[22] PCT Filed: Apr. 8, 1992

[86] PCT No.: PCT/JP92/00437
§ 371 Date: Dec. 30, 1993
§ 102(e) Date: Dec. 30, 1993

[87] PCT Pub. No.: WO93/01222
PCT Pub. Date: Jan. 21, 1993

[30] Foreign Application Priority Data

| Jul. 3, 1991 | [JP] | Japan | 3-190707 |
| Oct. 1, 1991 | [JP] | Japan | 3-282151 |
| Feb. 29, 1992 | [JP] | Japan | 4-79001 |

[51] Int. Cl.⁶ .............................. C08G 18/10
[52] U.S. Cl. .............................. 528/59; 528/65
[58] Field of Search .................... 528/59, 65

[56] References Cited

U.S. PATENT DOCUMENTS

| 3,963,679 | 6/1976 | Ullrich et al. | 264/211 |
| 4,192,928 | 3/1980 | Tanaka et al. | 521/177 |

FOREIGN PATENT DOCUMENTS

| 57-185313 | 11/1982 | Japan . |
| 60-149623 | 8/1985 | Japan . |
| 2-628 | 1/1990 | Japan . |
| 3-111419 | 3/1991 | Japan . |

Primary Examiner—Maurice J. Welsh
Attorney, Agent, or Firm—Flynn, Thiel, Boutell & Tanis

[57] ABSTRACT

A thermoplastic polyurethane elastomer containing a very small amount of small grains, and having a high molecular weight and a narrow molecular-weight distribution. Such high-quality thermoplastic polyurethane is excellent in melt moldability and allows to prevent yarn breakage in producing fibers by melt spinning, for example. Such polyurethane elastomer can be produced by melt-polymerizing a prepolymer and a low-molecular diol at a relatively high temperature in a short period of time. This invention also provides an apparatus for producing the polyurethane elastomer, and fibers formed of said elastomer.

12 Claims, 2 Drawing Sheets

THERMOPLASTIC POLYURETHANE ELASTOMER, PROCESS FOR PRODUCING SAME, APPARATUS PRODUCING SAME AND ELASTOMER FIBERS MADE FROM SAME

TECHNICAL FIELD

This invention relates to a thermoplastic polyurethane elastomer, a process for producing same, an apparatus for producing same, and elastomer fibers made from same. More specifically, this invention relates to a polyurethane elastomer having a high molecular weight and a narrow molecular-weight distribution and containing a very small amount of polyurethane substrate-based small grains, a process for producing same, an apparatus for producing same and elastomer fibers made from same.

BACKGROUND TECHNIQUE

As a method for producing thermoplastic polyurethane, a solution polymerization method using a solvent and a bulk melt polymerization method not using a solvent have been known.

A method for producing a polyurethane elastomer by solution-polymerizing a polymer glycol, a diisocyanate compound and a crosslinking agent batchwise in a solvent gives a polyurethane elastomer having a relatively narrow molecular-weight distribution, but does not provide so high a degree of polymerization, requires a step of separating the solvent from the reaction product after the reaction, and is batchwise. Therefore, said method is extremely inefficient.

Japanese Patent Publication Sho 39-17098 (No. 17,093/1964) discloses a method for producing a polyurethane elastomer by bulk-polymerizing a polymer glycol and a diisocyanate compound batchwise in the absence of a solvent with a kneading machine such as a kneader.

This method affords a polyurethane elastomer having a high degree of polymerization. However, this polyurethane elastomer has a wide molecular-weight distribution and shows strong adhesion, so that said elastomer can hardly be peeled off from a rotating blade. In general, when conducting the reaction batchwise, it is very hard to strictly regulate proportions of starting materials to be fed in each batch, treatment temperatures, treatment times, a water content, extrusion times or the like. Due to this, a degree of polymerization and a molecular-weight distribution cannot be controlled and hence, it is quite difficult to make products uniform.

On the other hand, Japanese Patent Publication Sho 44-25600 (No. 25,600/1969) discloses a method for continuously producing a thermoplastic polyurethane resin, which comprises kneading a heat-molten liquid polyisocyanate compound and a compound containing at least two groups having an active hydrogen capable of reacting with an isocyanate group in a multi-screw extruder for a residence time of 3 to 60 minutes to polymerize them. This document describes 50° to 200° C. as a polymerization temperature, and employs a residence time of 7 to 15 minutes and a polymerization temperature (a cylinder temperature) of 140° to 195° C. in Examples.

Japanese Patent Publication Sho 49-3451 (No. 3,451/1974) discloses a method for producing polyurethane elastic yarns by a continuous synthesis in the absence of a solvent and a direct spinning, which method includes a step of preliminarily reacting a high-molecular dihydroxy compound having a molecular weight of 500 or more with an organic diisocyanate such that 70 to 100% of a finally necessary amount of the high-molecular dihydroxy compound substantially becomes an isocyanate group, Said document shows 150° to 250° C. as a reaction temperature of a prepolymer formed in the above preliminary reaction step, the remaining high-molecular dihydroxy compound and a low-molecular dihydroxy compound, and adopts 180° C.×15 minutes and 160° C.×20 minutes as reaction conditions in Examples.

Japanese Patent Publication Hei 3-54963 (No. 54,963/1991) discloses a method in which when continuously producing a thermoplastic polyurethane by reacting in an extruder a high-molecular diol having an average molecular weight of 500 to 3,000, a low-molecular diol having a molecular weight of less than 500 and an organic diisocyanate, a molar ratio of the amount of isocyanate groups of the organic diisocyanate to a total amount of hydroxyl groups of the high-molecular diol and the low-molecular diol is adjusted to the range of 1±0.002 to control variation in melt viscosity of the resulting polyurethane. Said document describes that regarding the reaction (polymerization) temperature in the extruder, when the temperature is too high, the reaction rate becomes high and the mixing rate becomes low relatively, so that the mixing is insufficient and uniform polyurethane cannot be obtained or decomposition of the organic diisocyanate and the reaction product occurs, which is therefore undesirable. The recommanded polymerization temperature (a temperature inside the extruder) which is adopted in Examples of said document is 220° C. at the highest. Said document does not have a description of 220° C. or higher.

Japanese Laid-open Patent Application (Kokai) Hei 2-20514 (No. 20,514/1990) discloses a process for producing thermoplastic polyurethane by melt polymerization using, as a high-molecular diol, a polyester diol or a polycarbonate diol containing a residue of 2-methyl-1,8-octanediol or a residue of 1,9-nonanediol. Said document shows a polymerization temperature of at least 200° C. but at most 240° C., and describes that with the polymerization temperature of 240° C. or lower, heat resistance of the resulting thermoplastic polyurethane increases.

Japanese Laid-open Patent Application (Kokai) Hei 2-191621 (No. 191,621/1990) discloses a thermoplastic polyurethane in which MB being MFR (a melt flow ratio) at 220° C. is 5 to 50 and a ratio (MB/MA) of MB and MA being MFR a 200° C. is 1 to 5. Said document states that the thermoplastic polyurethane has low temperature dependence of melt fluidity near 200° C. and is uniform and that conventional polyurethane containing an undissolved material or gel in large amounts cannot achieve this value. It is described in this document that the undissolved material is Judged by dissolving a given amount of polyurethane in dimethylformamide at room temperature and measuring an amount (wt. %) of the undissolved material. Said document discloses Example in which the reaction (polymerization) of a prepolymer from a high-molecular dlol and an organic diisocyanate with a low-molecular diol was conducted at a fixed temperature of 200° C. and Example in which the reaction was conducted at progressively elevated temperatures of 180° to 200° C.

The present inventors' investigations have revealed, however, that the polyurethane elastomer obtained by the above techniques, when subjected to ordinary melt-spinning, has difficulty in controlling the spinning temperature, allows formation of gels that prevent passage through a filter, and causes yarn breakage in spinning, etc. As a result, spinning for a long time is impossible, the yield varies in the range of 50 to 80%. Further, when producing a polyurethane elastomer sheet, a dimensional stability is inferior and fish eyes are formed, making it impossible to stably provide a good-quality sheet; moldability is still insufficient.

DISCLOSURE OF THE INVENTION

It is an object of this invention to provide a thermoplastic polyurethane elastomer which has a high molecular weight and a narrow molecular-weight distribution and which contains a very small amount of polyurethane-based small grains.

Another object of this invention is to provide a polyurethane elastomer which is excellent in melt moldability and which can solve problems such as yarn breakage in spinning, etc. due to the small grains in particular.

Still another object of this invention is to provide an industrially advantageous process for continously producing the thermoplastic polyurethane elastomer of this invention, which comprises subjecting a prepolymer composed of a high-molecular diol and an organic diisocyanate and a low-molecular diol to bulk melt polymerization at a relatively high temperature for a short period of time.

A further object of this invention is to provide polyurethane elastomer fibers formed of the polyurethane elastomer of this invention and having excellent qualities.

A still further object of this invention is to provide an apparatus for producing a polyurethane elastomer, which is suitable for giving the polyurethane elastomer of this invention by practising the production process of this invention.

The other objects and advantages of this invention will be clarified from the following description.

According to the present inventor, the above objects and advantages of this invention are, first, achieved by a thermoplastic polyurethane elastomer characterized in that (A) a number-average molecular weight is 160,000 to 200,000, a weight-average molecular weight is 300,000 to 450,000, and a weight-average molecular weight/number-average molecular weight ratio is in a range of 1.8 to 2.3, and (B) the number of polyurethane-based small grains contained in the elastomer is only 500 or less per kilogram of the polyurethane.

The polyurethane elastomer of this invention has, as described above, the number-average molecular weight of 160,000 to 200,000, and the weight-average molecular weight of 300,000 to 450,000. The preferable range of the number-average molecular weight is 170,000 to 200,000, and the preferable range of the weight-average molecular weight is 350,000 to 450,000.

The weight-average molecular weight/number-average molecular weight ratio of the polyurethane elastomer in this invention is 1.8 to 2.3. The preferable range of said ratio is 1.9 to 2.1.

The polyurethane elastomer of this invention contains only 500 or less polyurethane-based small grains per kilogram of the polyurethane. The polyurethane-based small grains shall be understood not to include additives being added to polyurethane, e.g., a filler and a delusterant such as titanium oxide, and an undissolved material (dust) being incorporated without intention. The number of the small grains is preferably 200 or less, more preferably 100 or less per kilogram of the polyurethane.

According to the present inventors' investigations, it has been found that the polyurethane-based small grains are (a) crystalline particles which have a size of 5 to 50 $\mu$m at 20° C. and melt at a melting point (Tm) of a homopolymer composed only of a hard segment making up the polyurethane substrate, or (b) gel-like particles which have a size of 5 to 50 $\mu$m at 20° C. and do not melt at the above melting point (Tm).

The thermoplastic polyurethane elastomer of this invention is a soft material which is usually rubbery at room temperature. This can be confirmed by observation with a polarization microscope. It shows that a crystallized portion of a hard segment in the polyurethane elastomer is color-formed (birefringence) and disappears when heated to a crystal melting point of a polymer composed of the hard segment. A mass having a size of 5 $\mu$m or more in the crystallized portion of the hard segment (hereinafter referred to as "a crystalline mass of the hard segment") has a crystal melting point of 245° to 260° C. in case of, e.g., 1,4-butanediol and 4,4'-diphenylmethane diisocyanate. Therefore, even when melt extrusion molding, e.g., melt spinning is conducted usually at 200° to 240° C., said mass remains as such in fibers or films and becomes a small grain or a core of the small grain, which causes troubles such as yarn breakage in spinning, insufficient unwinding of wound yarns due to notable hang-up, holing or weft bar of a knitted fabric, formation of fish eyes in a film, etc. Further, a large crystalline mass having a size of about 40 $\mu$m or above, for example, which does not pass a filter causes increase in filtration pressure. On the other hand, gel-like particles having a size of 5 $\mu$m or more, which do not disappear even at the above crystal melting point, are less color-formed than the crystalline mass and are amorphous in most cases. The gel-like particles remain as an undissolved material when dissolved in a solvent of a polyurethane elastomer. The gel-like particles being almost the same as the size of the filter pore can pass through the filter, but like the crystalline mass, become small grains or cores of small grains in the fiber, the film, etc., which gives rise to troubles. On the other hand, the color-formed portion having a size of less than 5 $\mu$m does not arouse the above troubles.

The polyurethane elastomer of this invention is preferably produced by bulk melt polymerization.

In accordance with this invention, there is second provided a process for producing the polyurethane elastomer of this invention.

The process of this invention is a process for producing a polyurethane elastomer, which comprises subjecting a polyurethane prepolymer composed of a high-molecular diol and an organic diisocyanate and a given amount of a low-molecular diol to bulk melt polymerization at a temperature of 240° to 270° C., preferably 245° to 265° C., while thoroughly mixing them, for 1 to 10 minutes in a screw extruder in such proportions that a molar ratio of total amount of hydroxyl groups of the high-molecular and low-molecular diols/amount of isocyanate groups of the diisocyanate is 0.95 to 1.05, to form polyurethane.

The organic diisocyanate used as a starting material in this invention may be either an aromatic or aliphatic diisocyanate which are generally used to produce a polyurethane resin. Examples of the organic diisocyanate include known diisocyanates such as 4,4'-diphenylmethane diisocyanate, toluene diisocyanate, naphthalene-1,5-diisocyanate, polymethylene polyphenylisocyanate, xylylene diisocyanate, 2,2'-dimethyl-4,4'-diphenylmethane diisocyanate, 1,3- or 1,4-bis(isocyanate methyl)benzene, 1,3- or 1,4-bis(isocyanate methyl)cyclohexane, 4,4'-methylenebiscyclohexyl metadiisocyanate, isophorone diisocyanate, hexamethylene diisocyanate and cyclohexane diisocyanate; and isocyanurated products, carbodiimidated products and biureted compounds of these isocyanates. These organic diisocyanates may be used either singly or in admixture of two or more.

Preferred examples of the high-molecular diol include a polyester diol, a polyether diol, a polycarbonate diol and a polyester ether diol. They may be used either singly or in admixture of two or more. Examples of the polyester diol include polycondensed products of ethylene glycol, propylene glycol, 1,4-butanediol, 1,5-pentanediol, 1,6-hexanediol, neopentyl glycol, 2-methylpropanediol and the other low-molecular diols and low-molecular dicarboxylic acids such as glutaric acid, adipic acid, pimelic acid, suberic acid, sebacic acid, terephthalic acid and isophthalic acid; and polylactone diols obtained by ring opening polymerization of lactones, such as polycaprolactone glycol, polypropiolactone glycol and polyvalerolactone glycol. Examples of the polyether diol include polyalkylene ether glycols such as polyethylene ether glycol, polypropylene ether glycol, polytetramethylene ether glycol and polyhexamethylene ether glycol. Examples of the polycarbonate diol include polycarbonate diols obtained by condensing low-molecular diols, e.g., aliphatic or alicyclic diols such as 1,4-butanediol, pentanediol, 1,6-hexanediol, octanediol and decanediol with diphenyl carbonate or phosgene.

Preferred examples of the polyester ether diol include polyalkylene ether diols such as polyethylene ether glycol, polypropylene ether glycol, polytetramethylene ether glycol and polyhexamethylene ether glycol.

The average molecular weight of these high-molecular diols is preferably 500 to 3,000, more preferably 500 to 2,500. When the average molecular weight is too low, compatibility with the organic diisocyanate is too good, decreasing elasticity of the resulting polyurethane. On the other hand, when the average molecular weight is too high, compatibility with the organic diisocyanate is so poor as not to well conduct mixing in the polymerization step, and a gel-like mass is formed, making it hard to obtain stable polyurethane.

The low-molecular diol is a diol having a molecular weight of less than 500. Preferred examples of the low-molecular diol include aliphatic and aromatic diols such as ethylene glycol, propylene glycol, 1,4-butanediol, 1,5-pentane glycol, 3-methylpentane glycol, 1,6-hexanediol and 1,4-bishydroxyethylbenzene. They may be used either singly or in combination.

In the process of this invention, among the above starting materials, a polyurethane prepolymer composed of the high-molecular diol and the organic diisocyanate is first prepared and then the polyurethane prepolymer is reacted with a low-molecular diol.

The polyurethane prepolymer is preferably formed by (1) feeding the high-molecular diol and the organic diisocyanate in given amounts to a high-speed mixer, and mixing them thoroughly, and
(2) feeding the resulting monomer mixture into a reaction cylinder fitted with one or more perforated plates from its upper portion to cause it to flow down, during which the mixture is allowed to react to form a polyurethane prepolymer.

The high-molecular diol/organic diisocyanate molar ratio is preferably 4:1 to 2:1, more preferably 3.5:1 to 2.5:1. These starting materials are fed to the high-speed mixer at the given molar ratio, using a metering pump, for example. That is, these starting materials are mixed with a mixer which is rotated at high speed of preferably 500 to 4,000 rpm, more preferably 1,000 to 3,000 rpm. The starting materials uniformly mixed with the high-speed mixer are fed into the reaction cylinder fitted with one or more perforated plates from its upper portion and are allowed to react during flowing-down, to form a polyurethane prepolymer. The perforated plate has an opening area ratio of 3 to 60%, more preferably 5 to 40%.

L/D of the reaction cylinder is preferably 2 to 30, more preferably 3 to 20.

It is advisable that a baffle cone is mounted under the perforated plate group in the reaction cylinder to increase plug flow property (rectification). It is advisable that an outer diameter of the baffle cone is 1/10 to 2/10, preferably ⅛ to ½ of the inner diameter of the reaction cylinder in the mounting position.

An average residence time in the reaction cylinder is preferably 15 to 120 minutes, more preferably 30 to 80 minutes. A reaction temperature is preferably 50° to 120° C., more preferably 70° to 90° C. It is advisable that feeding of the reactants to the reaction cylinder is controlled such that a level on the uppermost perforated plate, for example, becomes a predetermined value. It is advisable that the feeding of the given amounts of the high-molecular diol and the organic diisocyanate to the high-speed mixer is controlled by this level of the monomer mixture in the reaction cylinder.

The process of this invention is carried out by subjecting the above-obtained polyurethane prepolymer and the low-molecular diol to the bulk melt polymerization.

The polyurethane propolymer and the low-molecular diol are used in such proportions that the molar ratio (R value) of total amount of hydroxyl groups of the high-molecular and low-molecular diols/amount of isocyanate groups of the organic diisocyanate is 0.95 to 1.05. The preferable range of the molar ratio is 1.00 to 1.05.

When the R value is deviated from said range, the formed polyurethane elastomer is not satisfactory in physical properties or melt moldability, and there is a high possibility that many gel-like particles are contained in the elastomer. Thus, it is undesirable.

The polyurethane prepolymer and the low-molecular diol are fed to a screw extruder. It is also possible to preliminarily mix the polyurethane propolymer and the low-molecular diol to form into a uniform mixture with the high-speed mixer. As the screw extruder, a twin-screw extruder is suitable. The number of rotations is preferably 30 to 300 rpm, more preferably 60 to 200 rpm. The cylinder temperature of the polymerization zone is 240° to 270° C., preferably 245° to 265° C. It is advisable that at least one zone of the cylinder is set at a temperature near the melting point of a crystalline mass to disperse the formed crystalline mass by kneading. The top extrusion pressure is preferably 20 to 45 kg/cm$^2$. Thus, there is provided a high-quality polyurethane elastomer having less unevenness in molecular weight and containing a very small amount of grains. An average residence time varies depending on a screw or I/D, but is preferably 1 to 10 minutes, more preferably 2 to 6 minutes. Hence, the product is continuously extruded from an outlet in such short period of time. It is advantageous that the bulk polymerized polyurethane elastomer is, for example, led to water, rapidly cooled and pelletized.

In the reaction of the prepolymer and the low-molecular diol, a known polymerization catalyst such as dibutyltin laurate or N-methylmorphorine can also be used upon dispersing it in the low-molecular diol.

In general, a polyurethane elastic yarn is produced by a wet spinning method or a dry spinning method. Examples using a melt spinning method are relatively few. This is presumably because the melt spinning method involves problems that the conventional polyurethane elastomer is liable to form small grains; that since heat stability in melting is generally poor, long-term stable operation is difficult; and that since the polyurethane elastomer obtained by the melt spinning has poor heat resistance, restoration from deformation at high temperatures is insufficient.

There is a method in which after a polyisocyanate compound is added and mixed, the mixture is melt spun to improve thermal properties of urethane yarns obtained by melt spinning (see Japanese Patent Publication Sho 58-46,573 (No. 46,573/1983)). In this invention, the content of active isocyanate groups in polyurethane jetted from a kneading extruder is 0.5% by weight or more, preferably 0.5 to 1.1% by weight. When it is less than 0.5% by weight, heat resistance is not improved enough. On the other hand, when it exceeds 1.1% by weight, spinnability decreases, urethane yarns wound up are liable to hang up undesirably. The content of the active isocyanate groups in polyurethane is measured by dissolving polyurethane in dimethyl sulfoxide (DMSO), reacting the solution with excess dibutylamine, and titrating the remaining dibutylamine with an ethanol solution of hydrochloric acid, and is expressed by wt. % in terms of [NCO]. A suitable method for increasing the content of the active isocyanate groups is a method in which a polyisocyanate compound is added to polyurethane, in which the polyaddition reaction has completed and the content of the isocyanate groups has decreased, either directly or after pelletized and remelted, and the mixture is then melt spun. The thus-spun urethane yarns cause allophanate crosslinking during ageing at room temperature for more than one day to improve heat resistance.

The polyisocyanate compound used in this invention is a compound having at least 2 isocyanate groups in one molecule, and can be formed, for example, by adding 2 mols or more of an organic diisocyanate to a polyol used to synthesize polyurethane, and reacting the mixture. Trifunctional or higher polyols are also usable. The number of isocyanate groups contained in one molecule of the polyisocyanate compound is 2 to 4. Especially preferable is a diisocyanate compound containing 2 isocyanate groups. When the number of the isocyanate groups is too large, a viscosity of the polyisocyanate compound becomes too high, and it is difficult to treat.

The polyisocyanate compound has an average molecular weight of usually 500 or more, especially preferably 1,000 to 3,000. When the average molecular weight is lower than the above limit, a steam pressure is high at the temperature in adding and mixing the molten polyurethane, which is inconvenient in operation. Moreover, since the activity is too high, properties tend to change during storage, causing a nonuniform reaction during spinning. On the other hand, when the molecular weight is too high, the amount of the polyisocyanate compound to be added has to be large, and spinning after mixing tends to be unstable. This is undesirable.

The amount of the polyisocyanate compound in this invention is preferably 3 to 20% by weight, especially preferably 5 to 15% by weight, based on the mixture of the thermoplastic polyurethane elastomer to be spun and the polyisocyanate compound. The polyisocyanate compound can be also mixed with the molten polyurethane using a device in which they are mixed with a rotary kneader, and then spun. It is more preferable to use a mixer having a stationary kneading element. Examples of the mixer having the stationary kneading element are known mixers such as "Static Mixer" of Kennix Ltd, "Scare Mixer" of Sakura Seisakusho, "Honeycomb Mixer" of Tsubasa Kogyo K. K., and "T. K-ROSSISG Mixer" of Tokushukakogyo K. K. The shape and number of these stationary kneading elements vary depending on the used conditions: these are selected such that kneading is sufficiently completed before jetting the polyurethane elastomer and the polyisocyanate compound from the spinneret.

The thus-produced polyurethane elastic yarns have improved heat resistance, and the heat resistance is improved from about 40% to 60 to 90% in evaluation terms of an elongation recovery rate at 190° C. as will be later described.

The polyurethane elastomer of this invention can be molded into various articles. When producing molded articles such as fibers or films, the polyurethane elastomer can contain known additives such as a coloring agent, an antioxidant, a lubricant, a weathering agent, a heat resistance imparting agent, etc. Such additives can be pulverized or melted and then injected into a bent port of a screw extruder via a micro-metering pump or dispersed in a prepolymer.

The polymerized polyurethane elastomer can be extruded into a sheet from an outlet die of the screw extruder, or extruded into a strand and then pelletized with a pelletizer. Especially with an underwater pelletizer, spherical pellets are stably obtained and good biting can be provided in a spinning step: it is thus desirable.

From the aspects of energy efficiency, a water content, dust mixing, etc., it is more preferable that the polymerized polyurethane elastomer is melt spun as such or formed into a nonwoven fabric by melt blowing.

In accordance with this invention, there is also provided an apparatus for producing a polyurethane elastomer which is suitable for practising the above process of this invention, particularly the process of this invention, which includes also the step of producing the polyurethane prepolymer composed of the high-polymer diol and the organic diisocyanate.

That is, an apparatus for producing the polyurethane elastomer of this invention comprises (a) a high-speed mixer for forming a monomer mixture by mixing a high-molecular diol with an organic diisocyanate, (b) a reaction cylinder for forming a polyurethane prepolymer by the reaction of the monomer mixture, said cylinder being fitted with one or more perforated plates, and (c) a screw extruder for forming polyurethane by the bulk melt polymerization of the polyurethane prepolymer and a low-molecular diol.

The apparatus of this invention can further comprise a device for adding a polyisocyanate compound to the formed polyurethane and mixing them or an underwater pelletizer for pelletizing the formed polyurethane in water.

The apparatus of this invention will be described more specifically by referring to FIGS. 1 to 3 of the attached drawings.

Figures 1, 2:
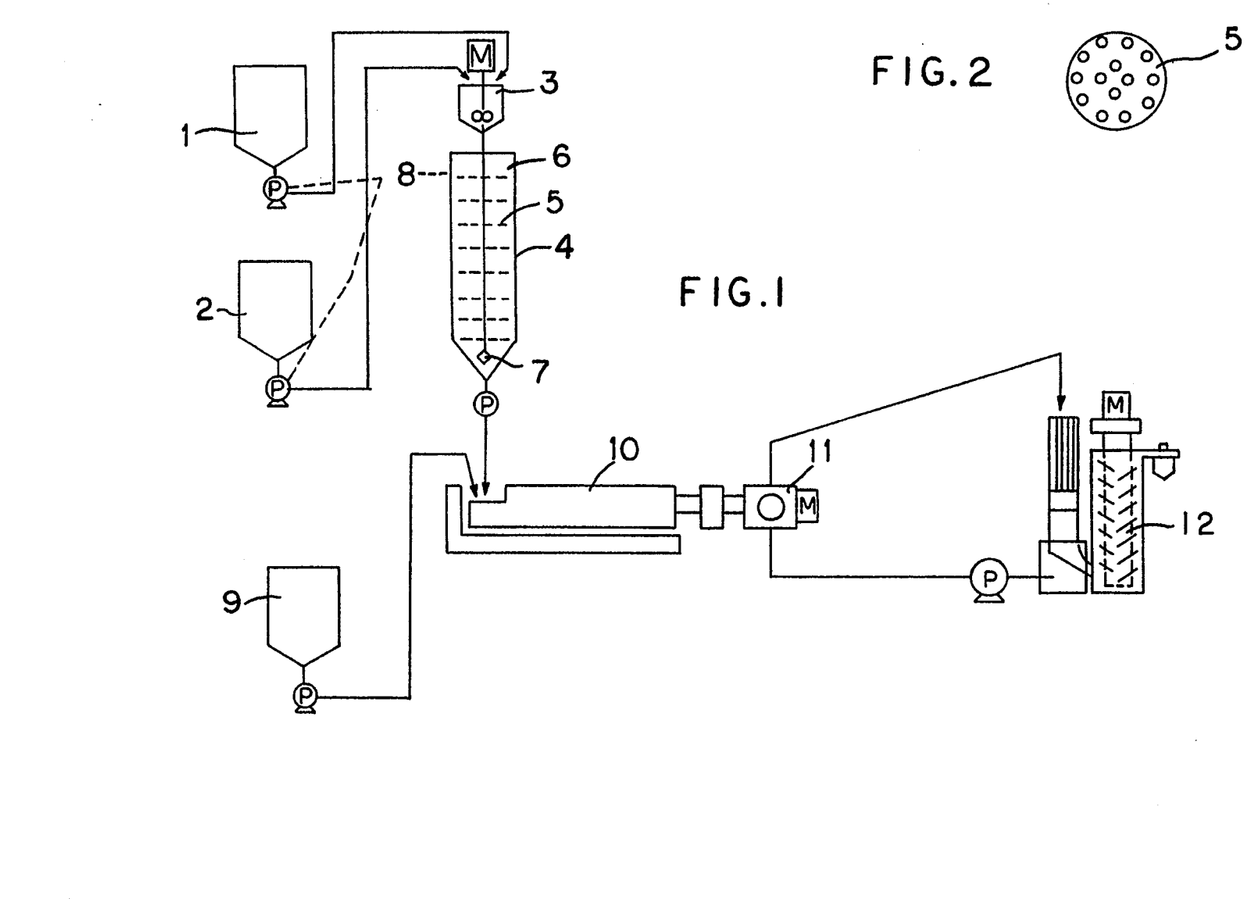
FIG. 1 is an example of an apparatus for producing a polyurethane elastomer of this invention.
FIG. 2 is an example of a perforated plate used in the apparatus.

In FIG. 1, 1 is a reservoir for a high-molecular diol, and 2 is a reservoir for an organic diisocyanate. The high-molecular diol and the organic diisocyanate are fed to a high-speed mixer 3 and well mixed. The resulting monomer mixture is then fed to a reaction cylinder 4 fitted with at least 1 perforated plate 5 (eight perforated plates in the drawing). FIG. 2 shows an example of the perforated plate. Preferably, a baffle cone 7 is provided in a lower portion of the perforated plate 5. Feeding of the high-molecular diol from the reservoir 1 and the organic diisocyanate from the reservoir 2 to the reaction cylinder 4 is preferably controlled by a level controlling zone 8 on the basis of a reactant level 6 in the reaction cylinder 4. The polyurethane prepolymer from the reaction cylinder 4 and the low-molecular diol from a reservoir 9 for a low-molecular diol are mixed preferably with the high-speed mixer and then introduced into a twin-screw extruder 10. In the twin extruding screw, the bulk melt polymerization in the process of this invention is carried out as described above. The polyurethane elastomer from the twin extruding screw is pelletized preferably with an underwater pelletizer and as required, introduced into a centrifugal dehydrator 12 to separate the pellets from water.

Figure 3:
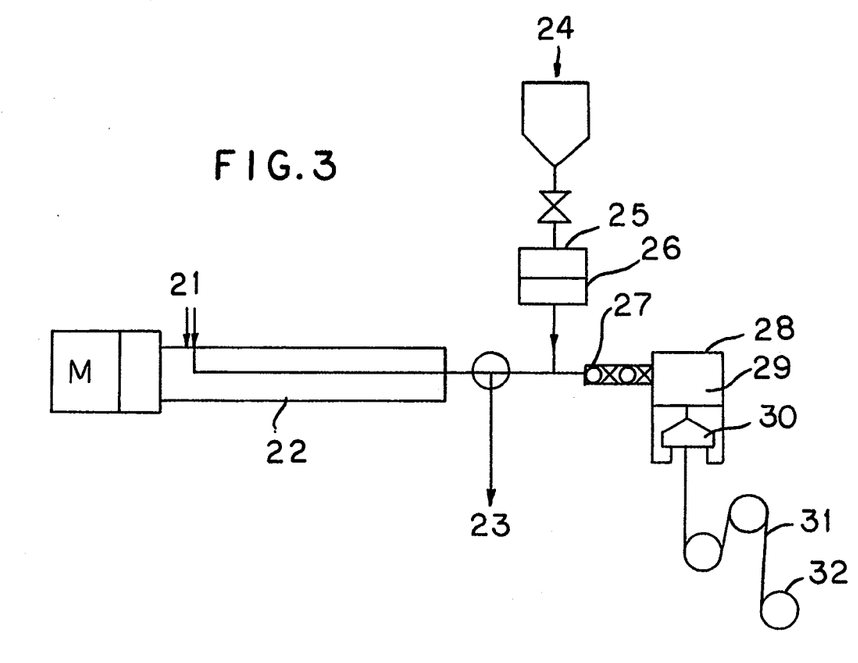
FIG. 3 is an example of a suitable apparatus for directly producing fibers having improved heat resistance from the polyurethane elastomer of this invention.

In FIG. 3, after a polyisocyanate 24 is added to the polyurethane elastomer formed in an twin extruding screw 22, they are uniformly mixed with a stationary kneading element 27, and then wound up as a filament 31 with a melt spinning device. That is, the prepolymer and the low-molecular diol 21 are fed from a feed opening of the twin extruding screw 22 to form a polyurethane elastomer. Part of the polyurethane elastomer is pelletized with a pelletizer 23 as required. To the polyurethane elastomer, a polyisocyanate 24 is added via a metering pump 25 and a filter 26, and they are uniformly mixed with the stationary kneading element 27. Subsequently, the resulting mixture is formed into a polyurethane elastic filament 31 with a melt spinning device comprising a spinning head 28, a metering pump 29 and a spinning nozzle 30, and wound up on a roll 32.

The polyurethane elastomer of this invention is, either directly or after pelletized, molded into various articles as stated above. In particular, fibers made of the polyurethane elastomer of this invention are extremely high-quality because the number of small grains contained in the elastomer is extremely small. Further, this invention allows to continuously produce the high-quality polyurethane elastomer stably for a short period of time and enables continuous operation for a long period of time (20 days or more). Still further, in producing the fibers, for example, yarn breakage in spinning owing to small grains is remarkably reduced, a spinneret life becomes longer, and the yield is improved to 85 to 98%.

Accordingly, this invention is to provide fibers formed of such polyurethane elastomer. The fibers of this invention can be used in combination with the other fibers and provide knitted articles such as stockings, swimming suits, inner wear, etc. in which holing, weft bar, etc. are greatly improved. Further, the fibers having improved heat resistance allows high-temperature dyeing or false-twisting, leading to widening of their usage.

EXAMPLES

The following Examples illustrate this invention more specifically. This invention is not limited to these Examples at all.

In this invention, small rains and a viscosity are measured and defined as follows.

Small grains:

Small grains having a diameter of 100 $\mu$m or more. The small grains are measured as follows. A fiber (a diameter thereof is usually about 20 $\mu$m to 70 $\mu$m) is run between a pair of roll bearings, and variation in interval therebetween is detected to count knots having a size of 100 $\mu$m or more with a strain gauge and observed same with a polarization microscope. Regarding a sheet and a film (a thickness thereof is usually about 20 $\mu$m to 600 $\mu$m), small grains having a size of 100 $\mu$m or more are counted with a microscope.

Molecular weight:

Absorption intensity is measured at 280 $\mu$m of UV light in a concentration of 0.35% by weight at a column temperature of 50° C. in the presence of dimethylformamide as a solvent using a gel permeation chromatograph equipped with a 710 model fully automatic sample processor manufactured by Waters Co., Ltd., a 590 model multipurpose pump manufactured by Waters Co., Ltd., a 481 model wavelength variable UV portion detector manufactured by Waters Co., Ltd., and K-80M and KD-802 model filling columns manufactured by Showa Denko K. K.

As standard samples, polystyrenes (weight-average molecular weights=1,951, 4,000, 20,800, 33,000, 111,000, 225,300, 498,000, 867,000, 2,610,0000) were used. Number-average molecular weights and weight-average molecular weights of the measured samples correspond to those of the standard polystyrenes.

Example 1

Preliminarily, 65.2 parts by weight of a polyester diol (polyhexanediol adipic acid ester: PHA, a molecular weight 2,000) obtained by polycondensation of adipic acid and 1,6-hexanediol and 26.5 parts by weight of 4,4'-diphenylmethane diisocyanate (MDI) were melted at 80° C. respectively. These melts were mixed with a high-speed mixer and allowed to react for 2 hours with a stirrer-equipped preparation vessel kept at 80° C. to produce a prepolymer. Separately, 1,4-butanediol (1,4-BD) as a low-molecular diol was prepared in a reservoir kept at 80° C. To a twin-screw extruder (rotating in the same direction) having a diameter of 45 mm, the prepolymer was fed from the preparation vessel at a rate of 18.7 kg/hr and the low-molecular diol from the reservoir at a rate of 1.3 kg/hr respectively via a metering pump to conduct polymerization. The cylinder temperatures of the twin-screw extruder were 160° C., 200° C., 220° C., 250° C. and 210° C. in this order from a starting material feed opening. The extrudate was discharged from a two-hole spinneret having a diameter of 2.4 mm with the number of screw rotations of 150 rpm at an extrusion pressure of 35 kg/cm(using a 60 μm filter) in an average residence time of 4 minutes, and pellets could be obtained stably with an underwater pelletizer.

Then, the pellets were dehydrated and dried to a water content of 80 ppm or less. Melt spinning of 30 denier 1 filament×8 was then conducted with a single screw extruder having a diameter of 25 mm at a head temperature of 190° C. through a 40 μm spinning filter. Yarn breakage in spinning was extremely few. When small grains were measured on the resulting polyurethane elastomer monofilament, it was found that the polyurethane elastomer contained a very small amount of the small grains. The results are shown in Table 1.

Example 2

A polyurethane elastomer monofilament was produced in the same manner as in Example 1 except that the high-molecular diol was changed to a polyether diol (polytetramethylene glycol: PTMG, a molecular weight 1,000) obtained by ring opening polymerization of tetrahydrofuran and that all the cylinder temperatures were elevated by 10° C. The results are shown in Table 1.

Comparative Example 1

The polyol (13.3 kg/cm$^2$) having the molecular weight of 2,000, 5.4 kg/cm$^2$ of MDI and 1.3 kg/cm$^2$ of 1,4-BD in Example 1 were continuously fed to a twin-screw extruder, and polymerized (a one-shot process) upon setting the cylinder temperatures at 75° C., 165° C., 240° C., 240° C. and 210° C. Using the pellets of the resulting polyurethane elastomer, a monofilament was produced as in Example 1. The results are shown in Table 1.

Comparative Example 2

The prepolymer (18.7 parts) and 1.3 parts of 1,4-BD in Example 1 were fed to a kneader heated at 90° to 150° C. The mixture was reacted for 30 minutes with stirring to obtain a polyurethane powder (a kneader method). The polyurethane powder was heat-treated at 95° C. for 18 hours, then fed to a twin-screw extruder having a diameter of 45 mm and pelletized. The cylinder temperatures of the screw were 160° C., 190° C., 210° C., 230° C. and 210° C. in this order from the feed opening. Using the pellets of the resulting polyurethane elastomer, a monofilament was produced as in Example 1. The results are shown in Table 1.

Comparative Example 3

A polyurethane elastomer and a monofilament thereof were produced in the same manner as in Example 1 except that the R ratio was changed to 1.07. The resulting monofilament contained a large amount of small grains having a gel-like substance as a core, and yarn breakage in spinning occurred a bit frequently. The results are shown in Table 1.

TABLE 1

| | Example 1 | Example 2 | Example 3 | Comparative Example 1 | Comparative Example 2 | Comparative Example 3 |
|---|---|---|---|---|---|---|
| Polymerization method | Prepolymer method | Prepolymer method | Prepolymer method | One-shot method | Prepolymer method | Prepolymer method |
| High-molecular diol | Polyester-type | Polyether-type | Polycarbonate-type | Polyester-type | Polyester-type | Polyester-type |
| Polymerization device | Twin-screw extruder | Twin-screw extruder | Twin-screw extruder | Twin-screw extruder | Kneader | Twin-screw extruder |
| Highest polymerization temperature (°C.) | 250 | 260 | 255 | 240 | 230 | 250 |
| R ratio | 1.01 | 1.01 | 1.01 | 1.01 | 1.01 | 1.07 |
| Amount of starting material (kg/hr) | 20 | 20 | 20 | 20 | — | 20 |
| High speed mixer | Yes | Yes | Yes | Yes | No | Yes |
| Number of small grains per kg | About 60 | About 85 | About 90 | About 10,000 | About 3,000 | About 1,000 |
| Number average molecular weight (Mn) | 170,850 | 165,570 | 160,250 | 153,970 | 163,160 | 125,300 |
| Weight average molecular weight (Mw) | 342,200 | 332,800 | 322,100 | 367,990 | 326,280 | 307,000 |
| Mw/Mn | 2.00 | 2.01 | 2.01 | 2.39 | 2.35 | 2.45 |
| Yarn breakage in spinning (time/kg) | 0.02 | 0.02 | 0.03 | 0.35 | 0.25 | 0.19 |

Example 3

A polyurethane elastomer filament was produced in the same manner as in Example 1 except that the high-molecular diol was changed into polyhexamethylene-1,6-carbonate glycol (a molecular weight 2,000) and that all the cylinder temperatures were elevated by 5° C. The results are shown in Table 1.

Example 4

(1) Seventy (70) parts by weight of a polyol having a molecular weight of 2,000, which was a mixture comprising a polyester diol (polybutanediol adipic acid ester: PBA) of adipic acid and 1,4-butanediol and a polyester diol (polyhexanediol adipic acid ester: PHA) of adipic acid and 1,6-hexanediol (a PBA:PHA mixing molar ratio=1:1), and 30 parts by weight of 4,4′-diphenylmethane diisocyanate (MDI) were prepared. To a high-speed mixer rotating at 3,000 rpm, the above polyol was fed at a rate of 13.4 kg/hr and MDI at a rate of 5.4 kg/hr from respective reservoirs held at 80° C. with a metering pump, and they were mixed in the mixer. Subsequently, the mixture was continuously fed to a reaction cylinder (an inner temperature 80° C.) having an inner diameter of 150 mm and a height of 1,400 mm and fitted with 5 perforated plates having a perforation ratio of 10%. The prepolymer (an average residence time 60 minutes) was discharged at a rate of 18.8 kg/hr from a lower portion. The level was controlled by feeding the polyol and MD to the high-speed mixer such that said level became fixed at a height of 1,100 mm. The amount of NCO groups of the resulting prepolymer was $(147\pm3)\times 10^{-5}$ mol/g.

(2) 1,4-Butanediol (1,4-BD) was used as the low-molecular diol, and the temperature was maintained at 80° C. The prepolymer in the above (1) and 1,4-BD were fed from a metering pump to a high-speed mixer rotating at 2,000 rpm, at feed rates of 19 kg/hr and 1 kg/hr respectively. Then, the uniform mixture was fed to a twin-screw extruder (rotating in the same direction) having a diameter of 45 mm, and polymerized. The cylinder temperatures of the twin-screw extruder were 200° C., 230° C., 260° C. and 260° C. in this order from a starting material feed opening. The molten polyurethane elastomer was extruded in water with the number of screw rotations of 100 rpm at an extrusion pressure of 35 kg/cm² from a 2-hole spinneret having a diameter of 2.4 mm. provided thereinside with a heater and having a surface coated with ceramics, and then immediately the extrudate was cut with an underwater pelletizer that conducted cutting with a rotary cutter having 3 blades to afford spherical pellets.

Subsequently, the pellets were centrifugally dehydrated and dried to a water content of 80 ppm or less, and then melt spinning of 30 denier 1 filament×8 was carried out with a single screw extruder having a diameter of 25 mm at a head temperature of 190° C. Small grains were measured on the resulting polyurethane elastomer monofilament. As a result, the polyurethane elastomer was found to contain a very small amount of the small grains. The results are shown in Table 2.

Comparative Example 4

A polyurethane elastomer monofilament was produced in the same manner as in Example 4 except that the cylinder temperatures of the twin-screw extruder were changed into 200° C., 220° C., 230° C. and 230° C. The results are shown in Table 2.

Example 5

The melt of the polyurethane elastomer polymerized in Example 4 was led as such to a melt blow spinning device having slits for jetting a heated gas in both sides of nozzles having a diameter of 0.8 mm and mounted in a row, and injected at a head temperature of 240° C. and a rate of 0.5 g/min in each nozzle. Air heated at 200° C. was jetted from the slits at a pressure of 3.5 kg/cm³ to conduct attenuation. The attenuated filament was collected on a conveyor made of a 30-mesh wire net and located 25 cm below the nozzles, and was taken off between rollers to obtain a nonwoven fabric having a weight of 50 g/m² (see Example 2 of Japanese Patent Publication Hei 1-30,945 (No. 30,945/1989)).

In the nonwoven fabric, monofilaments of the polyurethane elastomer fibers were laminated in a spread state, and intertwined points between the monofilaments were bound with each other by fusion. When small grains were measured, the number thereof was found to be as small as about 80 per kilogram. The fiber was composed of the narrow, uniform monofilaments having a diameter of about 20 μm.

Example 6

The dried pellets in Example 4 were melted with an extruder and then extruded onto a quenching rotary drum from a slit die of 240° C. to form a sheet having a film thickness of 0.6 mm.

When small grains of the resulting sheet were measured, the number thereof was found to be as small as about 80 per kilogram. Thus, the sheet was a good-quality sheet.

TABLE 2

| | Example 4 | Comparative Example 4 |
|---|---|---|
| Polymerization method | Prepolymer method | Prepolymer method |
| Prepolymer-preparation method | Continuous method | Continuous method |
| Polymerization temperature (°C.) | 260 | 230 |
| R ratio | 1.01 | 1.01 |
| Amount of starting material (kg/hr) | 20 | 20 |
| Number of small grains per kg | About 80 | About 5,000 |
| Number average molecular weight (Mn) | 196,500 | 201,550 |
| Weight average molecular weight (Mw) | 394,950 | 419,200 |
| Mw/Mn | 2.01 | 2.08 |
| Yarn breakage in spinning (time/kg) | 0.05 | 1.0 |

Example 7

Dihydroxy poly-ε-caprolactone (1,500 parts) having a hydroxyl number of 150 and 1,000 parts of p,p-diphenylmethane diisocyanate were reacted at 80° C. to obtain a viscous polyisocyanate compound. The polyisocyanate compound had an isocyanate content of 6.74% and a molecular weight of 1,250.

The polyurethane elastomer polymerized in Example 4 was introduced into the apparatus shown in FIG. 3, and part of the elastomer divided at the end of the extruder was injected into water from a spinneret having a diameter of 2.4 mm, and pelletized. After injecting the polyisocyanate compound, the other part was kneaded with a mixer having a stationary kneading element, weighed with a gear pump and spun into a monofilament having a denier of 40 at a take-up speed of 500 m/min. using a nozzle having a diameter of 1.0 mm. Spinning was conducted by changing the amount of the polyisocyanate compound added to polyurethane. The results are shown in Table 3.

The qualities of the filaments were measured after allowed to stand at room temperature for 2 days after spinning. The number of small grains in the filament was good and 1 or less per 1,000 m in each case. Incidentally, an elongation recovery rate at 190° C. based on which a heat resistance of the polyurethane elastomer fiber was evaluated was measured as follows.

(1) One hundred millimeters of the polyurethane elastomer fiber aged at room temperature for 2 days after spinning were left to stand in an oven of 190° C. in a state elongated to 130 mm.

(2) The fiber was left to stand at 20° C. for 2 minutes in a state elongated to 130 mm.

(3) Elongation was released, and 2 minutes later, the fiber length L (mm) was measured.

elongation recovery rate at 190° C.(%)=(130−L)/(130−100)×100

TABLE 3

| Run No. | 7-1 | 7-2 | 7-3 |
|---|---|---|---|
| Amount of polyisocyanate compound (wt %) | 0 | 7.5 | 15.0 |
| Content of active isocyanate (%) | 0.03 | 0.56 | 1.04 |
| Qualities of fibers | | | |
| Number of small grains per kg | About 80 | About 80 | About 80 |
| Strength (g/d) | 0.85 | 0.96 | 1.51 |
| Elongation (%) | 690 | 640 | 485 |
| 300% elongation stress (g/d) | 0.68 | 0.79 | 0.87 |
| Elongation recovery rate (%) | 79.8 | 80.4 | 84.6 |
| Elongation recovery rate at 190° C. (%) | 42 | 72 | 85 |
| Yarn breakage in spinning (time/kg) | 0.05 | 0.06 | 0.08 |

We claim:

1. A thermoplastic polyurethane elastomer, characterized in that
(A) a number-average molecular weight is 160,000 to 200,000, a weight-average molecular weight is 300,000 to 450,000, and a weight-average molecular weight/number-average molecular weight ratio is 1.8 to 2.3, and
(B) the number of polyurethane-based small grains contained in the elastomer is only 500 or less per kilogram of polyurethane, and
(C) the polyurethane elastomer is obtained by a bulk melt polymerization.

2. The polyurethane elastomer of claim 1 wherein the number of the small grains contained in the elastomer is only 200 or less per kilogram of polyurethane.

3. The polyurethane elastomer of claim 1 wherein the small grains are (a) crystalline particles which have a size of 5 to 50 μm at 20° C. and melt at a melting point of a homopolymer composed only of a hard segment making up the polyurethane substrate, or (b) gel-like particles which have a size of 5 to 50 μm at 20° C. and do not melt at the melting point of the homopolymer composed only of the hard segment making up the polyurethane substrate.

4. A process for producing a polyurethane elastomer, which comprises
(1) feeding the high-molecular diol and the organic diisocyanate in given amounts to a high-speed mixer and mixing them thoroughly,
(2) feeding the resulting monomer mixture to a reaction cylinder fitted with one or more perforated plates from its upper portion to cause it to flow down, during which said mixture is reacted to form a polyurethane prepolymer, and
(3) subjecting the polyurethane prepolymer and a given amount of a low-molecular diol to a bulk melt polymerization at a temperature of 240° to 270° C., while thoroughly mixing them, for 1 to 10 minutes in a screw extruder in such proportions that a molar ratio of total amount of hydroxyl groups of the high-molecular and low-molecular diols/amount of isocyanate groups of the diisocyanate is 0.95 to 1.05, to form polyurethane.

5. The process of claim 4 wherein the feeding of the given amounts of the high-molecular diols and the organic diisocyanate in the step (1) to the high-speed mixer is controlled by a level of the monomer mixture in the reaction cylinder in the step (2).

6. The process of claim 4 wherein the step (2) is carried out by further providing a baffle cone under the perforated plate of the reaction cylinder.

7. Polyurethane elastomer fibers formed of the polyurethane elastomer of claim 1.

8. The polyurethane elastomer fibers formed of the polyurethane elastomer of claim 1 and having an elongation recovery rate at 190° C. of 60 to 90%.

9. A nonwoven fabric of polyurethane elastomer fibers formed by the melt blow molding of the polyurethane elastomer of claim 1.

10. A polyurethane elastomer sheet formed by melt-extruding the polyurethane elastomer of claim 1.

11. An apparatus for producing a polyurethane elastomer comprising
(a) a high-speed mixer for forming a monomer mixture by mixing a high-molecular diol and an organic diisocyanate,
(b) a reaction cylinder for forming a polyurethane prepolymer by the reaction of the monomer mixture, said reaction cylinder being fitted with one or more perforated plates, and
(c) a screw extruder for forming polyurethane by the bulk melt polymerization of the polyurethane prepolymer and a low-molecular diol.

12. The apparatus of claim 9 further comprising
(d) an underwater pelletizer for pelletizing the resulting polyurethane in water.

* * * * *